United States Patent [19]

de la Orden Azuaga

[11] Patent Number: 4,606,426

[45] Date of Patent: Aug. 19, 1986

[54] ANTI-THEFT DEVICE

[76] Inventor: Manuel de la Orden Azuaga, c./ Cardenal Rodrigo de Castro, 5, Sevilla, Spain

[21] Appl. No.: 667,534

[22] Filed: Nov. 2, 1984

[30] Foreign Application Priority Data

Nov. 8, 1983 [ES] Spain ............................... 275.583[U]

[51] Int. Cl.⁴ .............................................. B60R 25/04
[52] U.S. Cl. ..................................... 180/287; 70/252; 123/198 B; 200/43.01
[58] Field of Search .................. 180/287; 70/252, 255; 123/198 B; 200/44; 307/10 AT

[56] References Cited

U.S. PATENT DOCUMENTS

| 3,849,663 | 11/1974 | Bogusz | 180/287 |
| 3,903,986 | 9/1975 | Smith | 180/287 |
| 3,916,658 | 11/1975 | Barry | 180/287 |

Primary Examiner—Richard A. Bertsch
Attorney, Agent, or Firm—Abelman, Frayne, Rezac & Schwab

[57] ABSTRACT

An anti-theft device for automobiles incorporates an internally splined sleeve that is slidable on axially aligned splined sections of the steering column between a positions in which the sections of the steering column are interconnected, and, a disabling position in which the splines on an upper section of the steering column are located within an unsplined section interiorly of the sleeve and freely rotatable therein, and, the steering wheel is thus freely rotatable in either direction.

1 Claim, 4 Drawing Figures

ANTI-THEFT DEVICE

FIELD OF THE INVENTION

This invention relates to an anti-theft device for cars, which does not require modification in the esthetics of the vehicle in which it is to be installed, and, which ensures an optimum degree of security.

BACKGROUND OF THE INVENTION

Current anti-theft devices for vehicles block the steering column or prevent rotation of the engine. If an attempt is made to steal the vehicle, some mechanical part has to be forced, in the first case associated with the steering column, and in the second case associated with the engine. Consequent deterioration of those parts results, without preventing theft of the vehicle.

SUMMARY OF THE INVENTION

The anti-theft device of the present invention is based on a completely different functional philosophy, specifically on the absence of elements that must be forced, i.e., there are no mechanical parts which offer resistance to the attempted theft. On the contrary, the steering wheel, when the device is in the anti-theft position, becomes uncoupled from the steering linkage, and can thus turn freely in either direction, without fulfilling its purpose as a drive transmitter. Consequently, the vehicle cannot be maneuvered.

According to the present invention, the steering column is divided into two sections, with their ends grooved axially in the direction of their generatrices, and, the respective sections are coupled or uncoupled from each other by an internally grooved coupling bushing under the control of a key actuated mechanism.

Thus, the basic principle of the invention resides in cutting the steering column into two sections, and then using a device to couple or decouple the respective sections.

When the device is placed in the anti-theft position, steering of the vehicle is blocked while locking the wheels in the desired steering position, and, the steering mechanism is disabled with the vehicle stopped and the engine off. When the device is set in the driving position, a part joining the respective sections of the steering column drops to its downward position to connect the whole drive mechanism. In the case of this failing, then, no danger can occur, since possible uncoupling of the steering column sections can only be performed against the force of gravity. On activating the device as an anti-theft device, the engine is turned off before the upward movement of the joining element of the steering column sections is commenced, and it cannot be re-started until the said element re-connects the steering column sections.

Preferred embodiments of the invention will now be described with reference to the accompanying drawings, in which.

Figure 1:
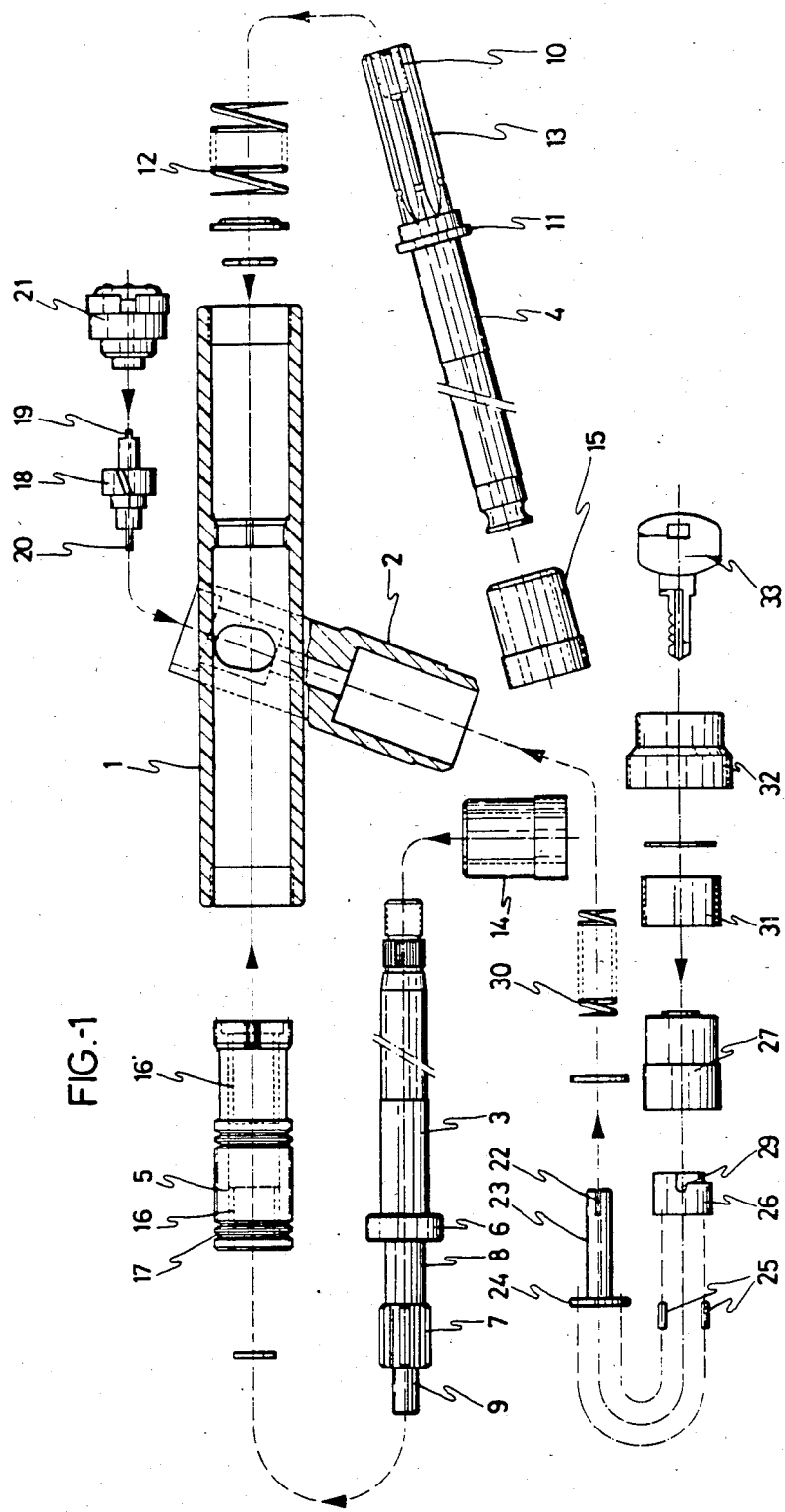
FIG. 1 is an exploded side elevational view of the various elements making up the anti-theft device of the invention, some of which appear in cross-section.

The anti-theft device comprises a coupling cylinder 1 and a drive cylinder 2, whose axes cross at an angle to each other, the angle depending on the type of car in which the device is to be installed.

The steering column extends through the coupling cylinder 1 and is divided into two sections. The top section 3 is connected directly to the steering wheel, and, the bottom section 4 is connected to the steering linkage for the vehicle wheels. The respective sections are separated from each other when the device is in the anti-theft position, and are coupled to each other by a sleeve 5 when the device is in the drive position.

The top section 3 of the steering column has a cylindrical stop 6 integral therewith, and, spaced from the stop 6 has a splined portion 7, which is spaced from the stop 6 by a cylindrical portion 8. Its free end terminates in a stub 9 which is received in a bore 10 in the bottom section 4, thus maintaining the two sections in axial alignment. The bottom section 4 has an integral cylindrical stop 11, and a compression spring 12 mounted on it.

The end of the section 4 is provided with continuous splines.

The two sections 3 and 4 of the steering column are journalled within the coupling cylinder 1 in bearings 14 and 15, which hold the said sections of the column in alignment and in a fixed axial positions by their engagement with the cylindrical stops 6 and 11.

The longitudinal splines 7 and 13 on the respective sections of the steering column enable axial displacement of the coupling sleeve 5, which has corresponding internal splines 16 and 16'. The internal splines 16 are spaced from the splines 16' by an unsplined portion of a length slightly greater than that of the splined portion 7 of the first section 3 of the steering column.

The external periphery of the coupling sleeve 5 is circumferentially grooved at 17 in order to provide a toothed rack profile extending axially of the sleeve 5 and overlying the internal splines 16.

Figure 2:
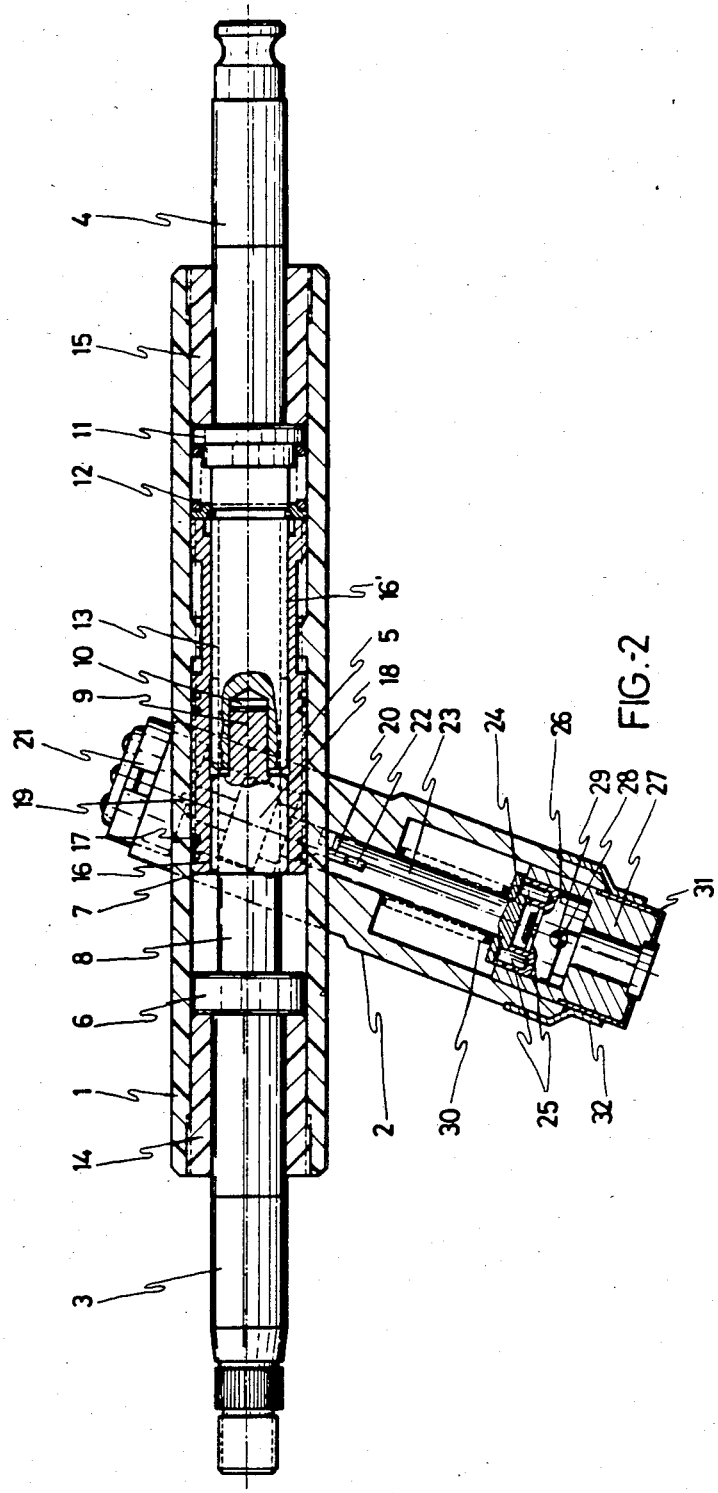
FIG. 2 shows the same elements in assembled relationship, also in partial cross-section.
Figure 3:
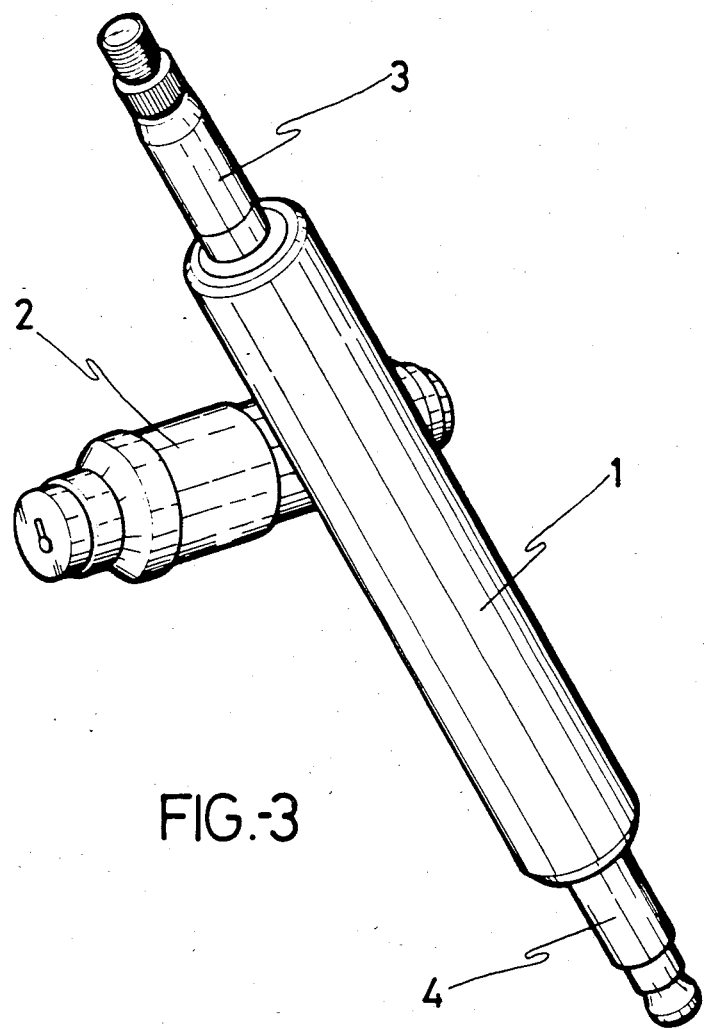
FIG. 3 shows the device in perspective.

The coupling cylinder 1 has an internally splined narrowing 1', which moves in an outer perimetral recess of the coupling sleeve 5, corresponding to its splines 16', as shown in FIG. 2.

Figure 4:
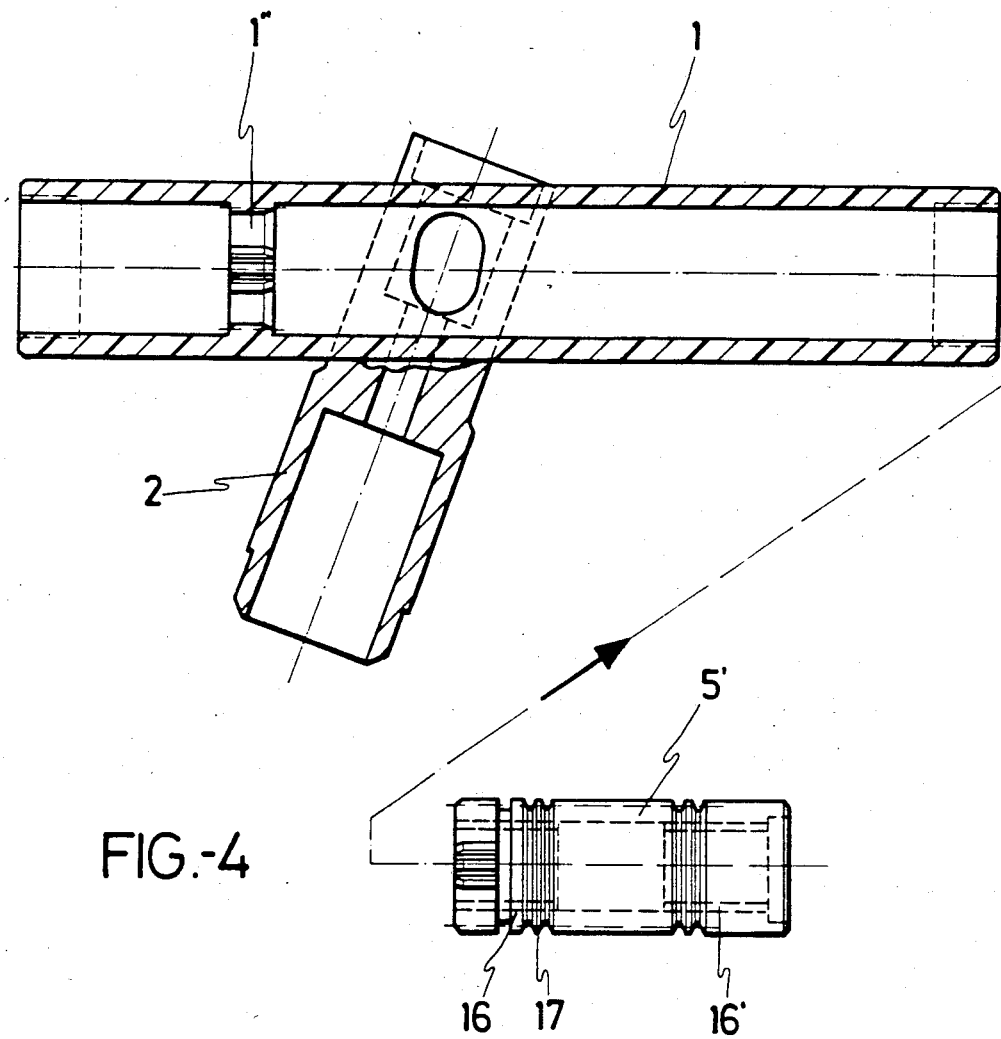
FIG. 4 is an exploded cross-sectional view of an alternative embodiment of the invention.

This narrowing can be positioned at the opposite end of the coupling cylinder 1, as is illustrated in FIG. 4, in which the said narrowing is marked with reference number 1''. In this case the coupling sleeve 5' lacks the said perimetral recess and is positioned with the coupling cylinder 1 through the opposite end thereof, as is also illustrated in FIG. 4.

When the sleeve 5 is in the bottom limit position as shown in FIG. 2, it is maintained stably in that position by gravity, with the splines 16 and 16' meshed with the spines 7 and 13, respectively, of the steering column sections 3 and 4. Hence the sleeve 5 provides a direct coupling between the steering linkage of the wheels and the steering wheel.

When the sleeve 5 is made to move upwards, the splines 7 of the top section 3 are positioned within the smooth central portion of the sleeves between the splines 16 and 16', and the splines 16 are positioned over the cylindrical portion 8, whereby the said upper section 3 linked to the steering wheel can turn idly in either direction, without transmitting its movements to the bottom section 4 or to the steering linkage.

Axial movement of the sleeve 5 is controlled by drive mechanisms located within the cylinder 2, and which include a pinion 18 having teeth cut at an angle, which are meshed with the rack 17 on the coupling sleeve 5.

The axle of the pinion 18 extends to both sides of the pinion and includes two tongues 19 and 20. The first tongue 19 links up with a group of contacts 21 of an electric switch controlling the engine. The second tongue 20 couples to the locking elements, specifically to a cotter 22 of a cylindrical body 23 to whose head, through pins 25, the drum 26 of the lock is fixed. A bushing 27 capable of shifting axially a short distance, as allowed by a stub 28 on being interlocked in the recess 29 of the drum 26. This displacement is performed against the compression of a spring 30, and the assembly is completed with the auxillary bushing 31 and the enclosing housing 32, through whose front the key 33 is inserted.

By inserting the key and pushing the drum 26, it shifts axially the short distance permitted by the stub 28 and against the tension of the spring 30, permitting the key to turn. The steering wheel has to be turned previously, until the splines 7 of the upper section 3 of the steering column align with the splines in the sleeve. At the limit of this displacement, the bushing 27 is thrust to a stable position.

This turning movement has been supplied to the pinion 18, producing the turning of the contacts in the electric switch 21, and consequently the ingition of the engine. Simultaneously, the sleeve 5 is shifted axially by the pinion 18 into the interlocking situation illustrated in FIG. 2, thereby unblocking the anti-theft device and enabling the steering. This position of the sleeve 5 is completely stable, as the pinion 18 cannot turn reversely, since it is prevented from so doing by the stub 28. Furthermore, in the event of failure of any part, such as a stub, the pinion axle, etc., the position of the sleeve 5 remains unchaged, and continues to occupy the lowest level due to the effect of gravity.

Obviously, the process is reversed in stopping of the engine and removal of the key, and the anti-theft device is enabled.

I claim:

1. An anti-theft device for an automobile having a steering column, comprising:

axially aligned first and second sections of said steering column arranged with their ends in juxtaposition and respectively journalled for rotation within a fixed housing;

axial splines on said first and second section and located within said housing, the splines on one said section being axially longer than the splines on the other said section; and, an internally splined sleeve positioned within said housing and slidable on and meshing with the splines of said first and second sections in one position of said sleeve, and, having an internal portion of an axial length and diameter greater than the splines of said other sections and in which said splines of said other section are received in the opposite position of said sleeve.

* * * * *